United States Patent
Oman

(10) Patent No.: US 7,190,776 B2
(45) Date of Patent: Mar. 13, 2007

(54) SYSTEM AND METHOD FOR SELECTING A FEATURE

(75) Inventor: Mihael Oman, St. Kranj (SI)

(73) Assignee: Siemens Aktiengesellschaft, Munich (DE)

( * ) Notice: Subject to any disclaimer, the term of this patent is extended or adjusted under 35 U.S.C. 154(b) by 429 days.

(21) Appl. No.: 10/245,703

(22) Filed: Sep. 18, 2002

(65) Prior Publication Data
US 2003/0063729 A1    Apr. 3, 2003

(30) Foreign Application Priority Data
Sep. 18, 2001    (DE)    ............... 101 45 987

(51) Int. Cl.
*H04M 3/42*    (2006.01)
(52) U.S. Cl. .............. 379/207.02; 379/207.11
(58) Field of Classification Search ............... 379/207.01–207.16, 210.01, 210.02, 211.01, 379/211.02, 212.01, 215.01, 219, 220.01, 379/221.01
See application file for complete search history.

(56) References Cited

U.S. PATENT DOCUMENTS

| 5,822,408 | A | * | 10/1998 | Bourbon ............... 379/201.01 |
| 6,104,786 | A | * | 8/2000 | Gibilisco et al. ........ 379/88.23 |
| 6,188,757 | B1 | * | 2/2001 | Malik ...................... 379/207 |
| 6,385,311 | B1 | * | 5/2002 | Bauer et al. .......... 379/201.02 |
| 6,393,117 | B1 | * | 5/2002 | Trell ...................... 379/207.1 |
| 6,463,053 | B1 | * | 10/2002 | Chen ........................... 370/352 |
| 6,839,420 | B1 | * | 1/2005 | Koponen .................. 379/219 |
| 2001/0036171 | A1 | * | 11/2001 | Tonnby et al. | |
| 2002/0021796 | A1 | * | 2/2002 | Schessel | |
| 2002/0077089 | A1 | * | 6/2002 | Contreras | |
| 2002/0126818 | A1 | * | 9/2002 | Cai et al. | |
| 2002/0141559 | A1 | * | 10/2002 | Gurgen | |
| 2003/0007621 | A1 | * | 1/2003 | Graves et al. | |
| 2003/0043787 | A1 | * | 3/2003 | Emerson, III | |

* cited by examiner

*Primary Examiner*—William J. Deane, Jr.
(74) *Attorney, Agent, or Firm*—Morrison & Foerster LLP

(57) ABSTRACT

A system and method in which a feature is selected for a busy terminal from a calling terminal. This results in a method with an improved selection of features that is specifically more user-friendly than other current methods.

12 Claims, 3 Drawing Sheets

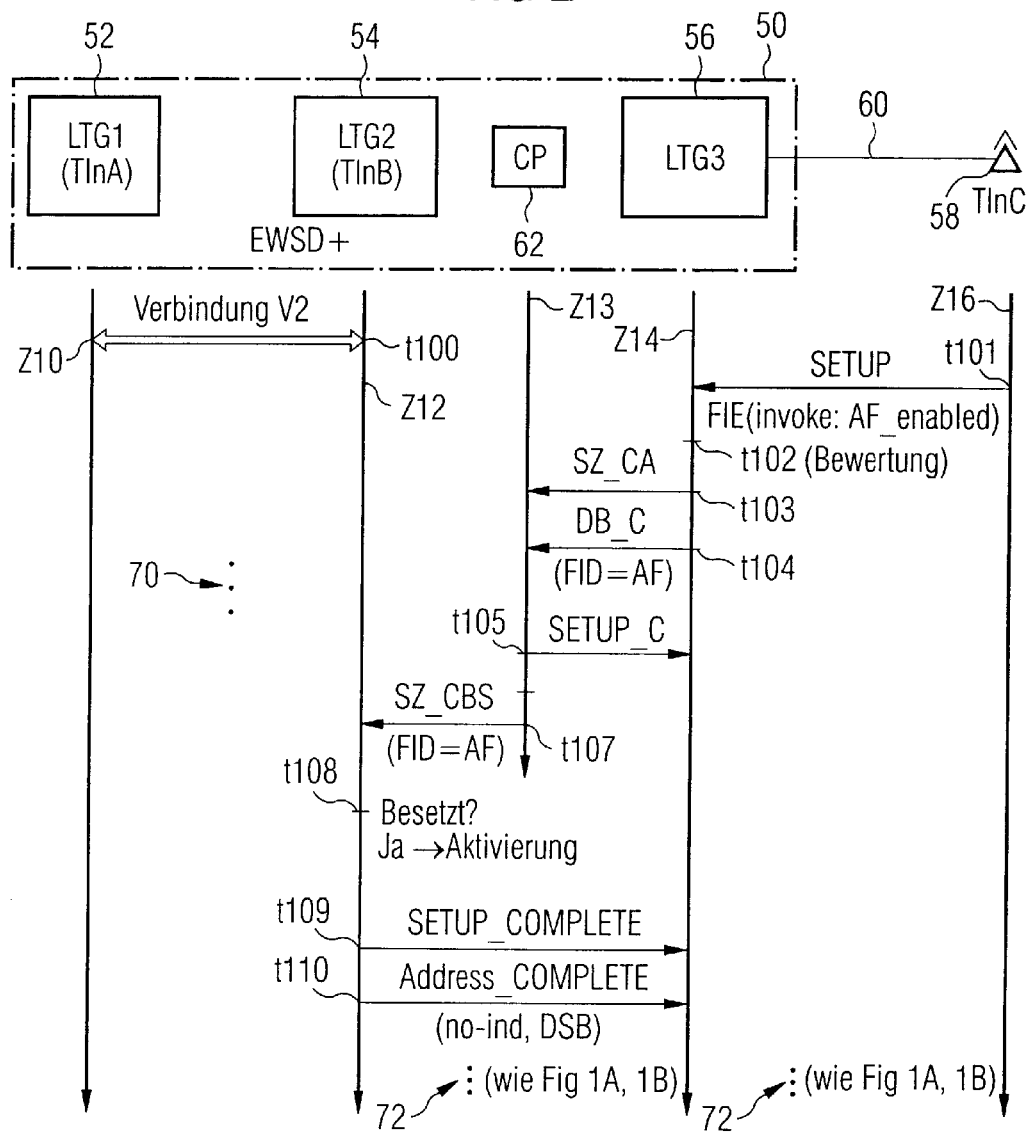

FIG 3

| Bit | Wert | |
|---|---|---|
| | | DSB |
| 0 | 0 | keine Auswahl |
| 1 | 1 | Anklopfen |
| 2 | 1 | Aufschaltung |
| 3 | 1 | Rückruf bei Besetzt |
| 4 | 1 | Vorrangverbindung |
| 5 | 0 | ⎫ |
| 6 | 0 | ⎬ frei |
| 7 | 0 | ⎭ ~80 |

FIG 4

| Bit | Wert | |
|---|---|---|
| | | DSX |
| 0 | 0 | keine Auswahl |
| 1 | 1 | Anklopfen |
| 2 | 0 | Aufschaltung |
| 3 | 0 | Rückruf bei Besetzt |
| 4 | 0 | Vorrangverbindung |
| 5 | 0 | ⎫ |
| 6 | 0 | ⎬ frei |
| 7 | 0 | ⎭ ~90 |

SYSTEM AND METHOD FOR SELECTING A FEATURE

CLAIM FOR PRIORITY

This application claims priority to Application No. 10145987.4 which was filed in the German language on Sep. 18, 2001.

TECHNICAL FIELD OF THE INVENTION

The invention relates to a system and method in which a feature that establishes the processing of requests for the same signaling states or operating states of a reference terminal is selected.

BACKGROUND OF THE INVENTION

A reference terminal is, for example, an analog telephone connected to, for example, a circuit-switched telephone network or an ISDN (Integrated Services Digital Network) telephone. However, this technology also relates to terminals that are connected to a packet-transmitting data transmission network, e.g., computers that are connected to the Internet. The terminals serve for the transmission of digital voice data, for example. However, other data can also be transmitted, for example video data, depending on the structure of the terminal.

Features or services supplement pure transmission services and make their use more user-friendly. For example, there are the following features for the ISDN, particularly the Euro-ISDN:
 call waiting (Dial Call Waiting),
 automatic call-back if a line is "busy" (Call Completion Supplementary Service),
 conference calls,
 holding a connection.

Similar features are also being slowly established for packet-transmitting data transmission networks, for example, by the ITU-T (International Telecommunication Union—Telecommunication Standardization Sector) or the IETF (Internet Engineering Task Force).

The operating state of the terminal characterizes the current mode of operation if, for example, the terminal is just transmitting data or it is in a waiting state in which it is not busy. In addition to the "busy" or "engaged" state and the "not busy" state, there is a multitude of other operating states of the terminal, for example the "not answering" operating state, in which a subscriber using the terminal or an operator is called using a signaling device, but does not go to the terminal to operate it.

Until now, the features for processing requests in different operating states of the terminal were established from the reference terminal end. The selection established was stored in memory for the reference terminal. Each subscriber could therefore select features only for himself/herself. For example, a subscriber could select from two options for the "busy" operating state with a reference terminal, namely whether he/she wishes to select the "call back if busy" (CCSB) feature or the "call waiting" feature. A prerequisite in this connection was that these features had also been activated for the subscriber in question by the network operator, usually in return for payment of a fee. To date, other selection possibilities have been created, for example for features that relate to the "no answer" operating state. In this case, call forwarding to an answering machine or to another connection is possible, for example. The selection possibilities available to date are being extensively utilized by a large number of subscribers and/or users.

SUMMARY OF THE INVENTION

In the invention, there is an improved method for selecting a feature. In addition, related units are indicated, in particular a related switching center, a related telecommunications system, a switching center that performs the function of a telecommunications system and a related terminal.

In one embodiment of the invention, features can be further increased if the selection of features can be made from several terminals. For example, a pre-selection can be made from the reference terminal, and then a final selection based on the pre-selection can be made from a selection terminal. There are degrees of freedom that make it possible to expand the areas of use of features. To prevent features selected by a subscriber from being changed arbitrarily, the invention allows the selection of a feature from a selection terminal in conjunction with the utilization of a function belonging to the selected feature.

In one aspect of the invention, the feature is selected from a selection terminal that differs from the reference terminal and that directs the request to the reference terminal.

In another embodiment of the invention, the "busy" operating state, i.e., one of the most important operating states, is involved.

In another embodiment of the invention, when data is already being transmitted between at least two busy terminals. The data transmission between the two busy terminals, or between the reference terminal and the selection terminal, is unidirectional in the one direction, unidirectional in the other direction, or bi-directional. During the data transmission between the two busy terminals, the selection terminal generates a data transmission request to transmit data between the selection terminal and the reference terminal. The data transmission request is processed depending on the feature that is selected from the selection terminal side.

This embodiment relates to features that relate to the "busy" operating state. There is already a multitude of features that establish possible subsequent reactions, particularly for the "busy" operating state. To date, one of these features could only be selected by the subscriber using the reference terminal, and only separately from a request. However, this embodiment of the invention provides a method in which the subscriber who wishes to reach the busy reference terminal, if it is busy, can decide for himself/herself what feature he/she wishes to select, for example "call waiting" or a "call-back."

In still another embodiment of the invention, for the selection of features in the "busy" state, a feature that can be selected relates to a function by means of which the arrival of a data transmission request is signaled to the reference terminal without ending the data transmission. This feature is also known as "call waiting". In this connection, in the case of a voice transmission, for example, a signal tone is inserted into the data transmission between the busy terminals. However, the data transmission between the two busy terminals is not interrupted when this happens, or is interrupted very briefly.

In another embodiment, a feature that can be selected relates to a function that ends the data transmission connection between the busy terminals and establishes a data transmission connection according to the data transmission request, i.e. between the selection terminal, which is not busy at first, and a reference terminal, which is busy at the start of the procedure. This feature is also called a "priority connection."

In another embodiment, the feature that can be selected relates to a function by means of which the fact that the data transmission between the reference terminal and the busy terminal has ended is signaled to the selection terminal, after it has ended. This feature is also called "call back if busy."

In yet another embodiment, a feature that can be selected relates to a function by means of which the reference terminal is included in the data transmission between the reference terminal and the busy terminal. Telecommunications systems also call this feature "break-in if busy". The three terminals are then connected in a conference circuit, for example a telephone conference or a video conference.

In still another embodiment, a list with features that can be selected is transmitted to the selection terminal from the reference terminal side. The list includes a feature preselection. The list or a part of the list is displayed on the selection terminal, for example on a screen or on an LCD display (Liquid Crystal Display). At the non-busy terminal, a feature is selected from the list, for example using a keyboard. Selection data is transmitted to the reference terminal side. During processing of the selection data, the function that belongs to the selected feature is performed. With this procedure, a feature is selected in a simple manner. At the same time, the selection terminal can be controlled by way of a simple stimulus protocol or by way of a functional protocol.

In another embodiment according to the invention, the data is transmitted in data packets in at least part of the data transmission network. Preferably, the data is transmitted in accordance with the Internet Protocol (IP), particularly in accordance with the TCP protocols (Transmission Control Protocol).

In another embodiment, the data is transmitted in transmission channels, i.e., circuit-switched, in at least part of a data transmission network. However, there are already data transmission methods in which the data is transmitted in data packets in one or more segments, and in transmission channels in one or more segments.

In another embodiment according to the invention, the reference terminal and the selection terminal are operated at different switching centers of a circuit-switched telecommunications network. In a land-based network, on the one hand, "operated" means that the terminals are connected with the switching center in question, and in a mobile telephone network, on the other hand, that the terminals are assigned to the switching center at least at certain times. During signaling in the telecommunications network, standards are adhered to such as those that apply in Europe, the United States or Japan.

In still another embodiment, with terminals at different switching centers, ISUP (ISDN User Part) messages are briefly transmitted between the switching centers in order to process the data transmission request and select the feature. ISUP messages are established by the ITU-T (International Telecommunication Union—Telecommunication Standardization Sector).

The ISUP messages can be expanded, in a proprietary manner, specifically using the method described in Standard Q.765 of the ITU-T, such that the functions according to the invention can be performed. These proprietary expansions may be included in the standard at a later time.

In yet another embodiment of the invention, the reference terminal and the selection terminal are operated at different connection modules of a switching center of a circuit-switched telecommunications network. The switching center works according to a standard that applies in Europe, the United States and Japan, for example, depending on where the switching center is set up.

In another embodiment of the invention, which relates to the operation of the reference terminal and the selection terminal at a switching center, internal messages that correspond to the ISUP messages are transmitted between the connection modules of the switching center to process the data transmission request and to select the feature. Each manufacturer uses its own messages within the switching centers. These messages are particularly simple if they are an image of the external signaling messages and are designed to meet the ISUP standard.

In yet another embodiment according to the invention, the reference terminal and the selection terminal are operated in a telecommunications system or in a switching center that performs the functions of a telecommunications system. The telecommunications system control or the switching center that performs the functions of the telecommunications system processes the request. A switching center that performs the functions of a telecommunications system is also called a CENTREX (Central Office Exchange). This embodiment improves the selection of features on the level of the telecommunications systems. The user group of a telecommunications system is usually restricted to the employees of a company or a large government office. In a separate telecommunications system, there are no charges for internal connections. In a telecommunications system whose functions are performed by a switching center, features of the telecommunications system can be used by the subscriber group assigned to the telecommunications system.

The invention also relates to a unit with a control unit, e.g. a switching center, a telecommunications system or a switching center that performs the functions of a telecommunications system. The control unit makes it possible to select a feature that establishes the processing of a request for a specific operating state of a reference terminal. The control unit is structured such that the feature can also be selected from a different terminal, namely the selection terminal, in connection with the use of a function that belongs to the selected feature. In other embodiments, the unit is structured such that during its operation, the invention is carried out. The invention also relates to a terminal.

BRIEF DESCRIPTION OF THE DRAWINGS

In the following, exemplary embodiments of the invention are explained in greater detail on the basis of the attached drawings, in which:

FIG. 2 show a process for the selection of a feature for the "busy" state, involving one switching center.

FIG. 3 shows a data set coming from the called B-subscriber, with a pre-selection of features.

FIG. 4 shows a data set coming from the calling A-subscriber, with a final selection of a feature.

DETAILED DESCRIPTION OF THE PREFERRED EMBODIMENT

Figure 1A:
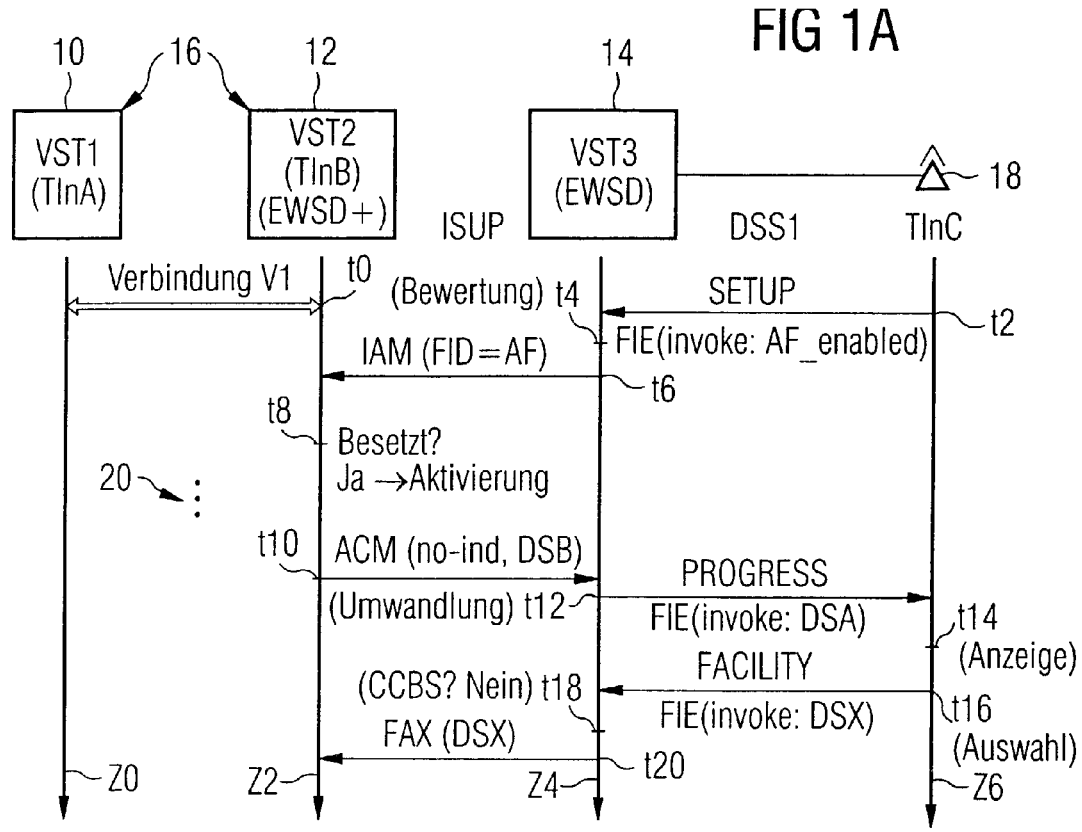
FIGS. 1A and 1B show a process for the selection of a feature for the "busy" state, involving several switching centers.
Figure 1B:
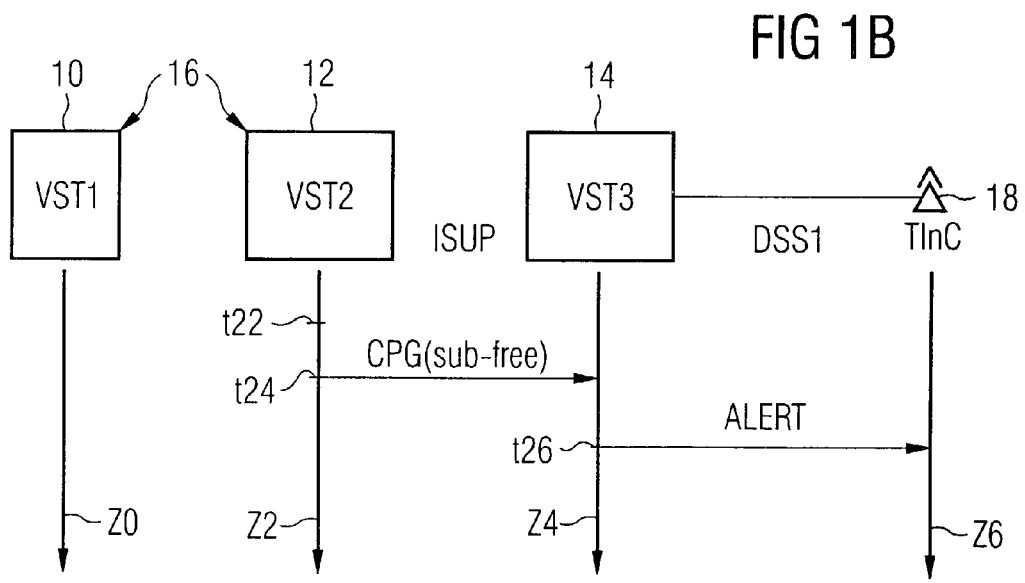

FIGS. 1A and 1B show a process for the selection of a feature for the "busy" operating state, with the involvement of several switching centers 10, 12 and 14, which are components of a telecommunications network 16. The switching centers 10 and 14 are switching centers of the EWSD type [<u>e</u>lektronisch gesteuertes <u>d</u>igitales <u>W</u>ähl <u>s</u>ystem=electronically controlled digital dialing system] type from Siemens AG, for example. The switching center 12 is also a switching center of the EWSD type, for example, but expanded to include functions for carrying out the process explained below. The telecommunications network 16 is a circuit-switched telecommunications network 16, for example, such as the telecommunications network of Deutsche Telekom AG.

The telephone of a subscriber TlnA is connected with the switching center 10. The telephone of a subscriber TlnB is connected with the switching center 12. A telephone 18 of a subscriber TlnC is connected with the switching center 14. Time beams Z0, Z2, Z4 and Z6, in this order, serve to represent process steps that relate to the switching center 10, the switching center 12, the switching center 14 and the telephone 18, respectively. Later points in time t are shown farther down in FIGS. 1A and 1B than earlier points in time t.

At a time t0, a connection V1 is established between the subscribers TlnA and TlnB, by means of which the subscribers TlnA and TlnB speak with one another. The connection V1 remains in existence during the process steps explained on the basis of FIGS. 1A and 1B at least up to a time t26 (see item 20)

At a time t2, the subscriber TlnC picks up the receiver of his/her telephone 18. This causes a SETUP message according to the DSS1 protocol (Digital Signaling System No. 1) to be generated and transmitted to the switching center 14. The SETUP message contains a feature information element FIE, in which a component identifier has a value that indicates that an operation is being requested, namely a value for the "invoke" operation. The operation is identified with an "AF_enabled" (Access Feature) identifier, i.e., as an operation for accessing the selection of features.

When the SETUP messagebrandy is processed in the switching center 14, the "AF_enabled" identifier is processed at a time t4. If the selection of features is activated for the subscriber TlnC, i.e., if the subscriber TlnC is entitled to select features, and if at least one of the features that can be selected is activated for the subscriber TlnC, a feature identifier FID is assigned the value AF and transmitted from the switching center 14 to the switching center 12 at a time t6, using an IAM (Initial Address Message). The IAM is established in the ISUP protocol. If the subscriber TlnC is not authorized to select features, or if at least one of the features that can in principle be selected for the "busy" state is not activated for the subscriber TlnC, the IAM does not include any feature identifier FID with the value AF.

For the sake of simplicity, FIG. 1A does not show any messages concerning transmission of the dialed numbers. The switching center 12 to which the IAM is supposed to be sent is determined on the basis of the numbers dialed by the subscriber TlnC.

After the IAM is received, it is determined at a time t8 in the switching center 12 that the called subscriber TlnB cannot be reached at that time because his/her terminal is busy. Based on this determination, the system starts to implement the commands of a program for the selection of a feature. This starts, among other things, a timer that results in the automatic termination of this program after its completion. In addition, the system checks which features have been activated for the subscriber TlnB with regard to the "busy" state and can therefore be selected. The result is noted in a data set DSB, the structure of which is explained in greater detail below on the basis of FIG. 3. It is assumed that the "call waiting," "break in if busy," "call back if busy," and "priority connection" features can be selected, so that the data set DSB includes four comments.

At a time t10, the switching center 12 generates an ACM (Address Complete Message) according to the ISUP standard. The ACM includes a "no-ind" identifier, which indicates that the ACM is being used as a means of transport for data of another application to be transmitted, namely for transmission of the data set DSB. The data set DSB is contained in a so-called APP data structure (Application Transport Parameter).

After the ACM is received in the switching center 14, the data set DSB is evaluated. At the same time, those identifiers for features that are also available for the subscriber TlnC are entered into a data set DSA, which has the same structure as the data set DSB. It is assumed that the subscriber TlnC is entitled to the "call waiting," "break in if busy," and "call back if busy" features. The data set DSA therefore includes three comments for these features. At a time t12, the switching center 14 sends the PROGRESS message according to the DSS1 protocol. The PROGRESS message includes a feature information element FIE with the "invoke" identifier for identifying that an operation is being requested. The operation relates to the evaluation of the data set DSA (see the identifier "DSA" with the same name). The data of the data set DSA is transmitted from the switching center 14 to the telephone 18, and they are displayed there on a display unit at a time t14.

At a time t16, the subscriber TlnC selects one of the displayed features, for example the "call waiting" feature. This causes a FACILITY message according to protocol DSS1 to be generated by the telephone 18. The FACILITY message includes a feature information element FIE in which the "invoke" identifier indicates that an operation is being requested. The operation is indicated with the "DSX" identifier and relates to the transmission of a data set DSX with the same name, the structure of which is explained in greater detail below on the basis of FIG. 4. The feature selected by the subscriber TlnC is noted in the data set DSX. The data set DSX is transmitted from the telephone 18 to the switching center 14.

After transmission of the data set DSX, at a time t18, the switching center 14 checks whether the subscriber TlnC has selected the "call back if busy" (CCSB) feature. If this is the case, the steps required for a call back are initiated by the switching center 14 and the process is subsequently ended. If, however, the subscriber TlnC has selected a different feature for the "busy" state, namely the "call waiting" feature in the exemplary embodiment, the switching center 14 sends an FAC (Facility) feature message according to the ISUP standard to the switching center 12 at a time t20, which message also includes the data set DSX. The data set DSX is evaluated in the switching center 12 at a time t22. On the basis of the comment for the "call waiting" feature, it is determined that the subscriber TlnC wishes to have the subscriber TlnB use call waiting. Accordingly, the switching center 12 causes a signal tone to be inserted into the line for the subscriber TlnB.

A CPG (Call Processing) message according to the ISUP standard is thereupon sent to the switching center 14 at a time t24. The CPG message signals that the subscriber TlnB is being called. After having received the CPG message, the switching center 14 generates an ALERT message according to the DSS1 protocol, at a time t26. The ALERT message signals that the subscriber TlnB is in principle capable of accepting the call. The subsequent process is carried out in the usual manner to date.

FIG. 2 shows a process for the selection of a feature for the "busy" state, with the involvement of one switching center 50, for example a switching center of the EWSD type from Siemens AG, where the switching center has been expanded to include functions for implementing the process explained below.

The switching center 50 includes three connection modules 52, 54 and 56, which are also called an LTG (Line Trunk Group). Each connection module 52, 54 and 56 serves to connect a multitude of subscribers, and contains a group coupling field, a group processor, and an interface to a central coupling network of the switching center 50. However, for the sake of simplicity the latter is not shown in FIG. 2. A subscriber TlnA is connected with the connection module 52. A subscriber TlnB is connected with the connection module 54. A telephone 58 of a subscriber TlnC is connected with the connection module 56 by way of a connection line 60.

A central processor 62 of the switching center 50 serves for adjusting the central coupling network and for communication between the connection modules 52 to 56.

Time beams Z10, Z12, Z13, Z14 and Z16 serve, in this order, to represent process steps that relate to the connection module 52, the connection module 54, the central processor 62, the connection module 56 and the telephone 58, respectively. Earlier points in time t are shown higher up in FIG. 2 than later points in time t.

At a time t100, a connection V2 is established between the subscriber TlnA and the subscriber TlnB, and this remains in effect during implementation of the process shown in FIG. 2 (see items 70).

At a time t101, the subscriber TlnC picks up the receiver of his/her telephone 58 to call the subscriber TlnB. This causes a SETUP message to be generated, which corresponds to the SETUP message generated at the time t2 and specifically includes the "AF_enabled" identifier. The "AF_enabled" identifier is evaluated at a time t102, in the way explained above on the basis of FIG. 1A for the time t4. In the exemplary embodiment, use of the feature for the selection of other features in the "busy" state is in turn activated for the subscriber TlnC. In addition, the subscriber TlnC is authorized to utilize several features for the "busy" state of a called terminal.

At a time t103, the connection module 56 generates an SZ_CA message that is internal to the switching center to produce a connection with a program module of the connection module 54. The SZ_CA message is directed to the central processor 62. At a time t104, the connection module 56 generates a DB_C message, which contains a feature identifier FID with the value AF, indicating that it should be possible to implement a selection of features if the terminal of the called subscriber TlnB is busy. The DB_C message is also directed to the central processor 62.

At a time t105, the central processor 62, using a SETUP_C message, confirms to the connection module 56 that a connection is being established to a program module in the connection module 54. The creation of this connection is initiated at a time t107, using an SZ_CBS message, which also includes a feature identifier FID with the value "AF." When the SZ_CSB message is received in the connection module 54, a partner program module to the program module in the connection module 56 provided for the subscriber TlnC is activated. This program module also evaluates the feature identifier FID. Based on the value AF, this program module checks, at a time t108, in the connection module 54 whether the terminal of the subscriber TlnB is currently busy. It is assumed that this is the case. The process steps already explained in connection with FIG. 1A, time t8, are thereupon carried out, in order to make it possible to select features for the "busy" state of the terminal of the subscriber TlnB. Among other things, the data set DSB of the subscriber TlnB is determined at the same time.

At a time t109, the partner program module in the connection module 54 sends a SETUP_COMPLETE message to the program module of the connection module 56 provided for the subscriber TlnC to confirm that an internal connection has been established between these two program modules.

At a time t110, the partner program module of the connection module 54 sends an ADDRESS_COMPLETE message to the program module of the connection module 56. The ADDRESS_COMPLETE message corresponds to the ACM already explained on the basis of FIG. 1A, and contains similar information, in other words the data set DSB, in particular. The ADDRESS_COMPLETE message therefore has a structure similar to that of the ISUP message that is sent at the time t10. The function of the two messages is also similar, but different functional units are involved in the transmission of the message. After the time t110, additional process steps 72 are carried out corresponding to the process steps already explained on the basis of FIGS. 1A and 1B, at times t12 to t26. In this connection, however, messages internal to the switching centers, which correspond to ISUP messages, are used in place of the ISUP messages.

FIG. 3 shows the data included in the data set DSB. The data set DSB has a length of eight bits. Bit 0 serves to identify a case in which no selection is possible. If Bit 1 has the value One, the "call waiting" feature can be selected. If, on the other hand, Bit 1 has the value Zero, the "call waiting" feature cannot be selected. Bits 2, 3 and 4, in that order, serve to note the "break in if busy," "call back if busy," and "priority connection" features. Bits 5 to 7 are currently not yet in use and serves as place holders ["wildcards"] for later features that relate to the "busy" state (see Bracket 80).

FIG. 4 shows an example of a data set DSX. The data set DSB includes eight bits, which have the same meaning as Bits 0 to 7 of the data set DSB. However, in the data set DSX, only one bit at a time is set to the value One, in order to identify the selection of the subscriber TlnA. Thus, Bit 1 has the value One in FIG. 4, because the subscriber TlnA has selected the "call waiting" feature. Bits 5 to 7, which are currently not in use, are identified with a Bracket 90.

In another exemplary embodiment, the exemplary embodiment explained on the basis of FIGS. 1A and 1B is modified in such a way that the subscribers TlnA, TlnB and TlnC belong to a so-called CENTREX group. This means that the switching centers 10 to 14 perform the functions of a telecommunications system for these subscribers. In this case, the system also checks at a time t8 whether the subscriber TlnB belongs to the same CENTREX group as the subscriber TlnC. The selection of features is possible within a CENTREX group.

Similar methods such as those explained using the figures can also be implemented for applications in which the data is transmitted via the Internet, for example using the VoIP service (Voice over IP).

What is claimed is:
1. A method for selecting a feature, comprising:
   selecting the feature that establishes processing of a request in an operating state of a reference terminal, the feature being selected from a selection terminal;
   directing the request via the selection terminal to the reference terminal that is in the operating state;

transmitting a list with at least one feature that can be selected to the selection terminal from the reference terminal side;

displaying the at least part of the list at the selection terminal;

selecting a feature from the list at the selection terminal;

transmitting selection data to the side of the reference terminal; and performing the function related to the feature selected as a function of the selection data.

2. The method according to claim 1, wherein the feature relates to processing of a request in the "busy" operating state.

3. The method according to claim 1, further comprising:

transmitting data between at least one busy terminal and the reference terminal;

generating a request to transmit data between the selection terminal and the reference terminal by the selection terminal during data transmission between the busy terminal and the reference terminal; and processing the request as a function of a feature that is selected from the selection terminal side.

4. The method according to claim 1, wherein the feature relates to at least one of the following:

a function such that arrival of the request is signaled to the reference terminal, without ending the data transmission between the reference terminal and the busy terminal, a function that terminates data transmission between the busy terminal and the reference terminal, and establishes a data transmission connection in accordance with the request, a function such that the data transmission between the busy terminal and the reference terminal has ended is signaled to the selection terminal, after it has ended, and a function such that the selection terminal is involved in the data transmission between the busy terminal and the reference terminal.

5. The method according to claim 1, wherein data is transmitted in data packets between the terminals in at least one segment of a data transmission network, and/or the data is transmitted in accordance with the Internet Protocol or a protocol based on this protocol.

6. The method according to claim 5, wherein the data is transmitted between the terminals in transmission channels in at least one segment of a data transmission network.

7. The method according to claim 6, wherein the reference terminal and the selection terminal are operated at different switching centers of a circuit-switched telecommunications network, and/or ISUP messages are transmitted between the switching centers to process the data transmission request and select the feature.

8. The method according to claim 6, wherein the reference terminal and the non-busy terminal are operated on different connection modules of a switching center of a circuit-switched telecommunications network, and/or messages internal to the switching center, which correspond to ISUP messages, are transmitted between the connection modules to process the data transmission request and select the feature.

9. The method according to claim 6, wherein the busy terminal and/or the reference terminal and/or the selection terminal are operated on a telecommunications system or on at least one switching center that performs the functions of a telecommunications system, and the telecommunications system control processes the data transmission request.

10. A unit that performs the functions of a telecommunications system, comprising:

a control unit;

a reference terminal operated on the control unit to select a feature to establish processing of requests in an operating state of the reference terminal, wherein the control unit is configured such that the feature can be selected from a selection terminal that directs a request to the reference terminal in the operating state.

11. The unit according to claim 10, wherein the unit selects the feature that establishes processing of a request in an operating state of a reference terminal, the feature being selected from a selection terminal, and directs the request via the selection terminal to the reference terminal that is in the operating state.

12. A terminal with a control unit, the control unit performing the following:

selecting the feature that establishes processing of a request in an operating state of a reference terminal, the feature being selected from a selection terminal; and directing the request via the selection terminal to the reference terminal that is in the operating state.

* * * * *